(12) United States Patent
Wang (10) Patent No.: US 8,064,472 B1
(45) Date of Patent: Nov. 22, 2011

(54) METHOD AND APPARATUS FOR QUEUE CONCATENATION

(75) Inventor: Sibing Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 892 days.

(21) Appl. No.: 11/857,326

(22) Filed: Sep. 18, 2007

Related U.S. Application Data (63) Continuation of application No. 11/250,873, filed on Oct. 14, 2005, now Pat. No. 7,573,896.

(51) Int. Cl.
*H04L 12/28* (2006.01)
(52) U.S. Cl. .................. 370/413; 370/235
(58) Field of Classification Search .............. None
See application file for complete search history.

(56) References Cited

U.S. PATENT DOCUMENTS

| | | | |
|---|---|---|---|
| 5,996,019 A * | 11/1999 | Hauser et al. ............... 709/235 |
| 6,954,466 B1 | 10/2005 | Dalleggio et al. |
| 7,092,360 B2 * | 8/2006 | Saint-Hilaire et al. ........ 370/241 |
| 7,542,415 B2 * | 6/2009 | Kang ........................... 370/229 |
| 7,558,890 B1 * | 7/2009 | Li et al. ........................ 710/52 |
| 2002/0064130 A1 * | 5/2002 | Siu et al. .................... 370/235 |
| 2002/0126683 A1 * | 9/2002 | Ahlfors et al. .............. 370/412 |
| 2002/0141427 A1 * | 10/2002 | McAlpine ................... 370/413 |
| 2003/0081549 A1 * | 5/2003 | Goetzinger et al. ....... 370/230.1 |
| 2003/0117958 A1 | 6/2003 | Nation et al. |
| 2004/0004961 A1 * | 1/2004 | Lakshmanamurthy et al. .......................... 370/364 |
| 2004/0252684 A1 | 12/2004 | Evans et al. |
| 2004/0257991 A1 * | 12/2004 | Sterne et al. ................. 370/230 |
| 2005/0135355 A1 * | 6/2005 | Muthukrishnan et al. .... 370/389 |
| 2005/0147034 A1 * | 7/2005 | Zhao et al. ................... 370/229 |
| 2005/0220114 A1 * | 10/2005 | Romano et al. ............. 370/395.4 |
| 2006/0067225 A1 * | 3/2006 | Fedorkow et al. ............ 370/235 |
| 2007/0127513 A1 * | 6/2007 | Sudini et al. ................. 370/413 |

* cited by examiner

*Primary Examiner* — Phirin Sam
(74) *Attorney, Agent, or Firm* — Heimlich Law, PC; Alan Helmilch, Esq.

(57) ABSTRACT

A method and apparatus for queue concatenation have been disclosed.

11 Claims, 6 Drawing Sheets

METHOD AND APPARATUS FOR QUEUE CONCATENATION

RELATED APPLICATION

This patent application is a continuation of, and claims priority of, U.S. application Ser. No. 11/250,873 filed Oct. 14, 2005 titled "Method and Apparatus for generic interface, packet cut-through, overbooking, queue concatenation, and logical identification priority for a System Packet Interface device", which is hereby incorporated herein by reference, which claims priority of U.S. Provisional Application Ser. No. 60/619,234 filed Oct. 15, 2004 titled "Method and Apparatus for generic interface, packet cut-through, overbooking, queue concatenation, and logical identification priority for a System Packet Interface device", which is hereby incorporated herein by reference.

FIELD OF THE INVENTION

The present invention pertains to memory queuing structures. More particularly, the present invention relates to a method and apparatus for queue concatenation.

BACKGROUND OF THE INVENTION

Queue memory structures are often used in communications, data processing applications, computing, etc. particularly where data or data streams may be "bursty" in nature and temporary storage of this data is needed. Fixed sized queues, statically allocated queue memory sizes, etc. may be too small in size to store enough data for an application or a data stream leading to loss of data. This may present a problem.

A current approach is to concatenate queues by externally connecting the flow control interfaces, however this involves exiting and entering the chip through an interface which ties up the interface, causes delay and latency issues, wastes pins and does not allow queue control. This may present a problem.

BRIEF DESCRIPTION OF THE DRAWINGS

The invention is illustrated by way of example and not limitation in the figures of the accompanying drawings in which.

DETAILED DESCRIPTION

The present invention as embodied in one embodiment of a device may be used in a variety of flow control applications, for example, for packet processing. A packet-exchange device solves a myriad of interconnect problems in networking markets. For example, in one embodiment queue concatenation offers a wide range of options for buffering capabilities.

In one embodiment of the invention, options and flexibility for demanding applications is provided. For example small or large data buffers may be needed to deal with the complex data aggregation techniques used in many system architectures. This may assist in aiding NPUs (Network Processing Units) as processing elements by helping to regulate end-to-end traffic flow, where the system "bursty" data can interfere with the correct operation of flow-control mechanisms.

Figure 3:
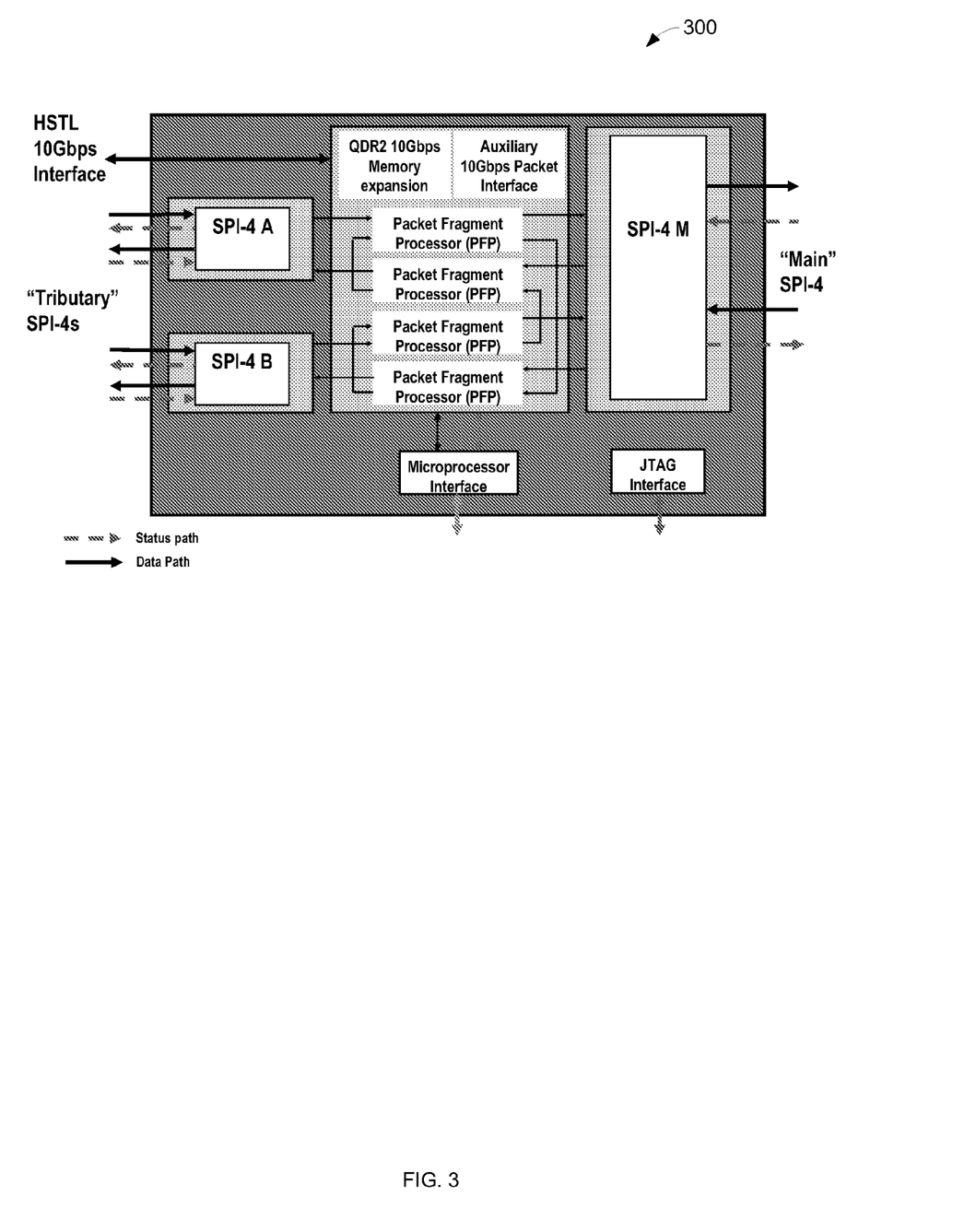
FIG. 3 illustrates one embodiment of the present invention in block diagram form.

FIG. 3 illustrates, generally at 300, one embodiment of the present invention in block diagram form. Shown in the block diagram are four packet fragment processors (PFPs). As may be seen the PFPs interface to multiple SPI interfaces.

Figure 4:
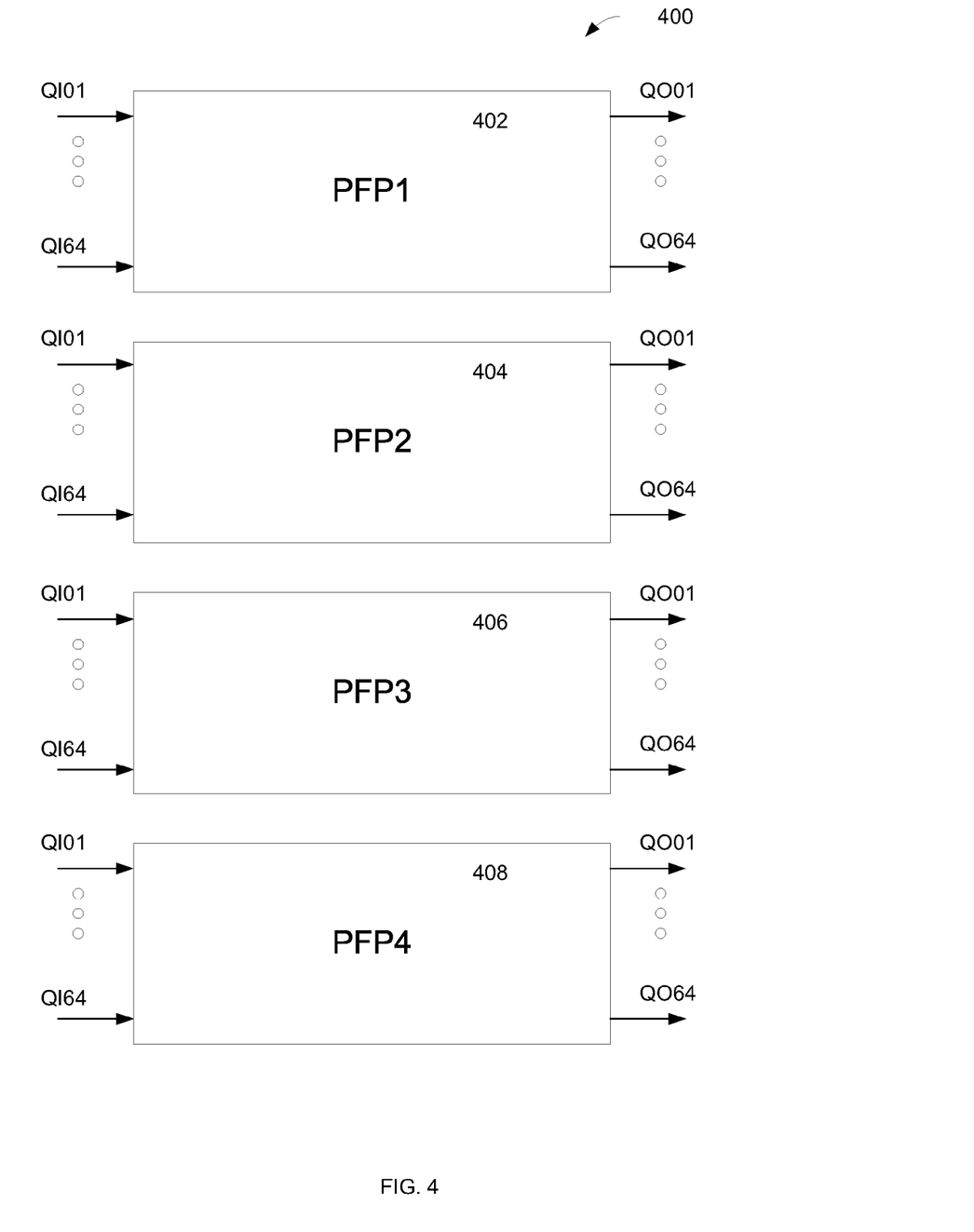
FIG. 4 illustrates one embodiment of the invention showing four PFP's (Packet Fragment Processors) where queue concatenation is supported.

FIG. 4 illustrates, generally at 400, one embodiment of the invention showing four PFP's where queue concatenation is supported. FIG. 4 illustrates in block diagram form four PFPs (PFP1 402, PFP2 404, PFP3 406, and PFP4 408) each having 64 queue channels (a QIxx and an associated QOyy). In one embodiment the queues may be implemented as a linked list arrangement. For illustration purposes queue inputs QIxx and queue outputs QOyy are shown discretely. In queue concatenation any queue output may be routed to any queue input thus extending the queue. This may assist with asymmetrical bandwidth situations. For example, to extend the length of queue 1 for PFP1 (402), the output Q001 may be routed to the input of queue 1 (QI01) of PFP2 (404). This connection would be denoted PFP1.QO01 to PFP2.QI01. The resulting queue would be from PFP1.QI01 to PFP2.QO01.

To extend the length another example would be PFP1.QO02 to PFP4.QI34, then PFP4.QO34 to PFP3.QI13, then PFP3.QO13 to PFP1.QI47, then PFP1.QO47 to PFP2.QI21. The "resultant" queue would then be from PFP1.QI02 to PFP2.QO21. If the queue lengths within each PFP were equal then the resulting PFP1.QI02 to PFP2.QO21 queue would be 5× the length of just the PFP1.QI02 to PFP1.OO02 (i.e. queue 2 of PFP1) length.

Figure 5:
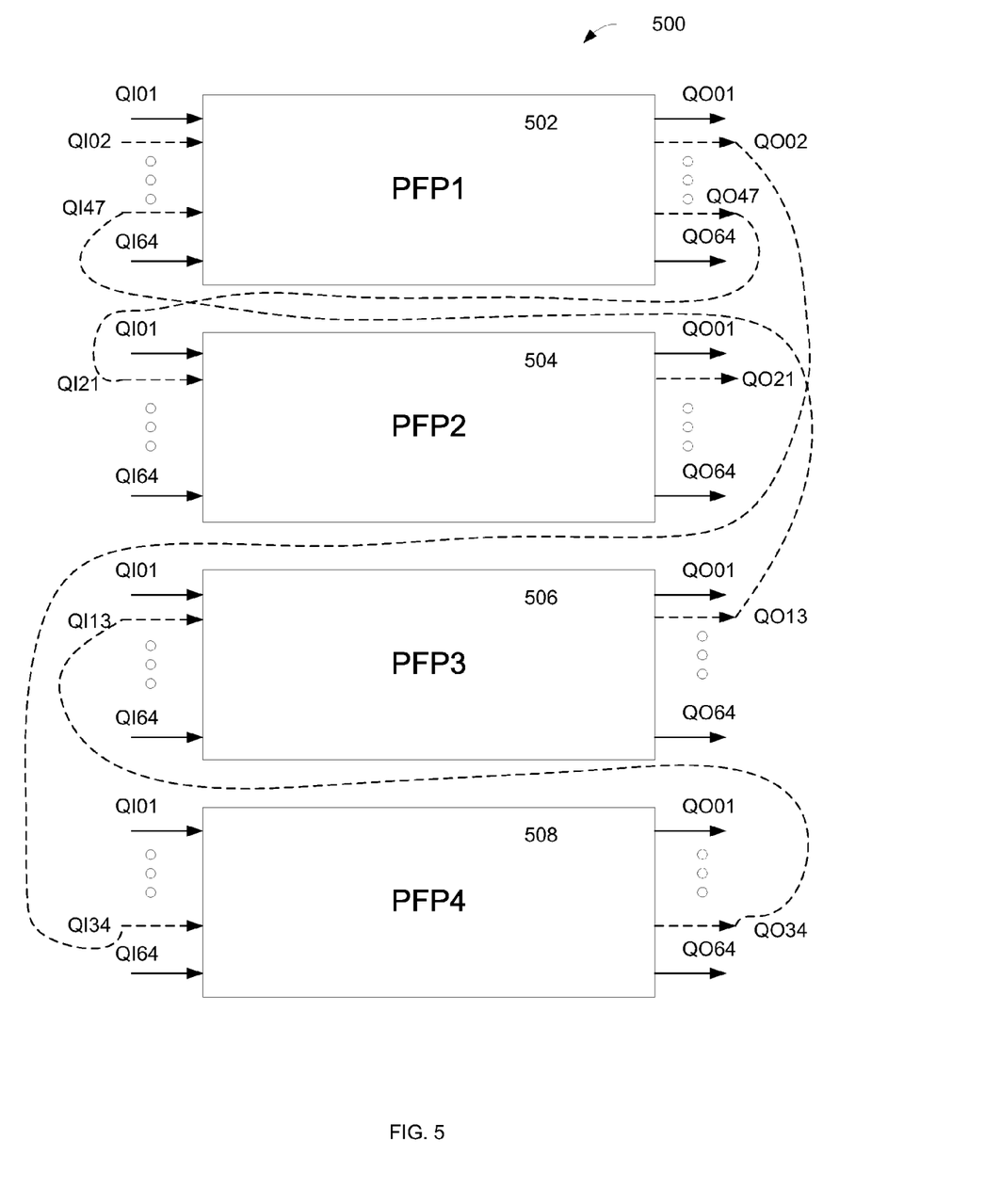
FIG. 5 illustrates one embodiment of the invention showing four PFP's and queue concatenation.

FIG. 5, generally at 500, illustrates the PFP1.QI02 to PFP2.QO21 connection discussed above. Dashed lines illustrate the connections for the PFP1-4 (502-508 respectively).

Figure 6:
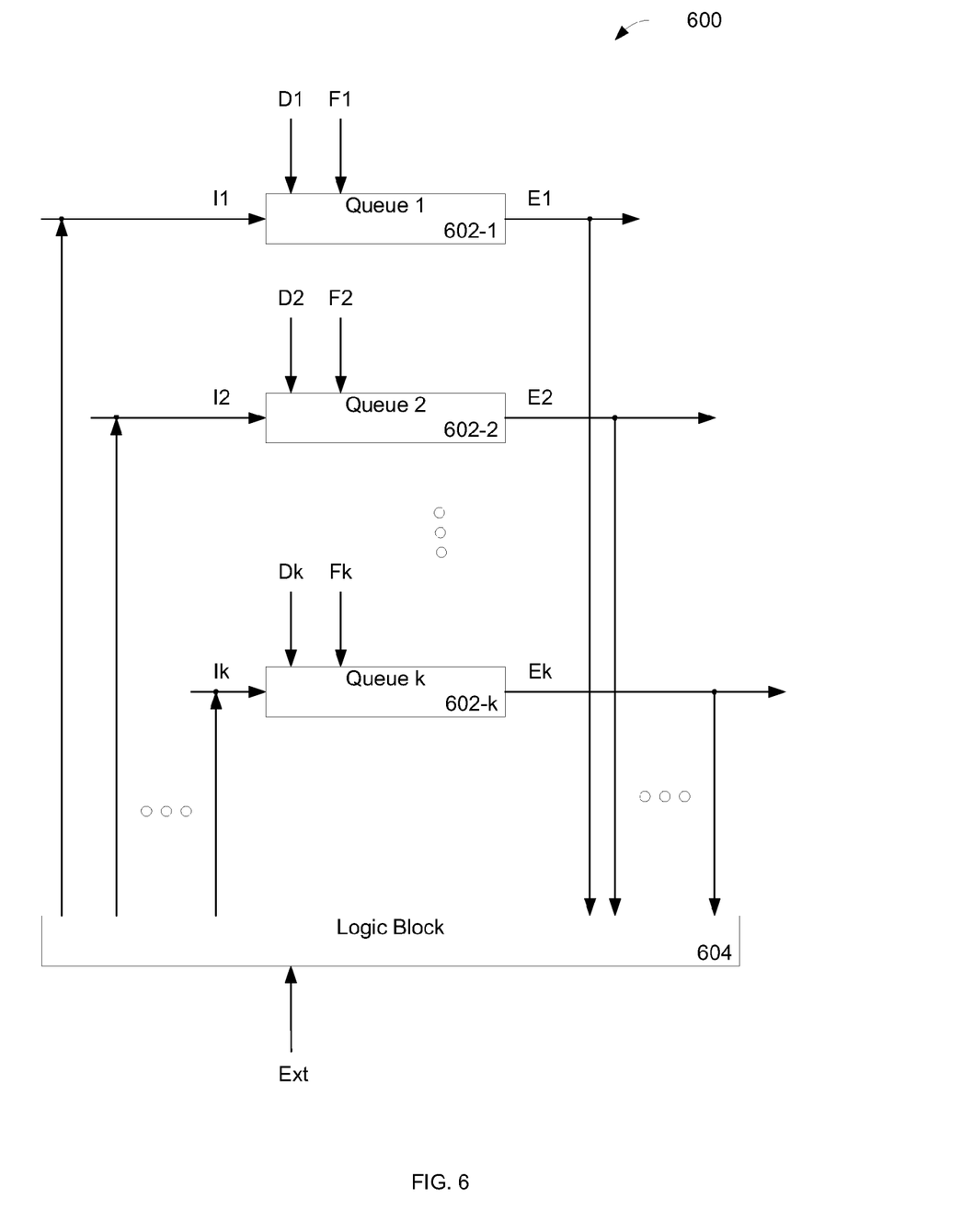
FIG. 6 illustrates one embodiment of the invention in block form.

FIG. 6 illustrates, generally at 600, one embodiment of the invention in block form. At 602-1, 602-2, through 602-k are individual queues each having a respective ingress I1, I2, through Ik; data inputs D1, D2, . . . , Dk; flow control inputs F1, F2, . . . , Fk; and egress E1, E2, . . . , Ek. At 604 is a logic block having an external input (Ext) and inputs from all the queue egress ports (E1, E2, . . . , Ek). The logic block 604 has outputs that connect to all the queue ingress (I1, I2, . . . , Ik). The logic block 604 is capable of connecting any queue egress to one or more ingress. In one embodiment the logic block 604 may be implemented in a hardware based cross-switch matrix. However the invention is not so limited and any switching mechanism, including for example software driven, may be used.

What is to be appreciated is that the present invention allows packet data available at the egress of a first internal queue to be scheduled based on queue status signals of a second internal queue or alternatively the packet data may be scheduled based on the status signals of an external interface. The selection of external or internal status signals may be performed per queue by a selector. The selection decision may be made based on classification of the packet data, state of an external queue buffer, characteristic of the traffic pattern comprised of the packet data or any other approach.

One of skill in the art will understand that the dynamic reconfiguration of queues allows a n:m (n to m) relationship to be established. For example, rather than having a fixed queue quantity and depth these may be changed as needed in response to, for example, asymmetrical data flow conditions. For example, if the queue length is 1 MB, then using FIG. 4 as an example the configuration of the 4 PFPs (PFP1 (402), PFP2 (404), PFP3 (406), PFP4 (408)) results in a 1 MB×256 arrangement for the queues. If there is asymmetrical traffic then, for example, as shown in FIG. 5, assuming again a 1 MB queue length, we have a 5 MB×1 (the QI02 to QO21 queue) and 1 MB×251 arrangement (1 MB×62 from PFP1, 1 MB×63 from PFP2, 1 MB×63 from PFP3, and 1 MB×63 from PFP4).

Thus a method and apparatus for queue concatenation have been described.

Figure 1:
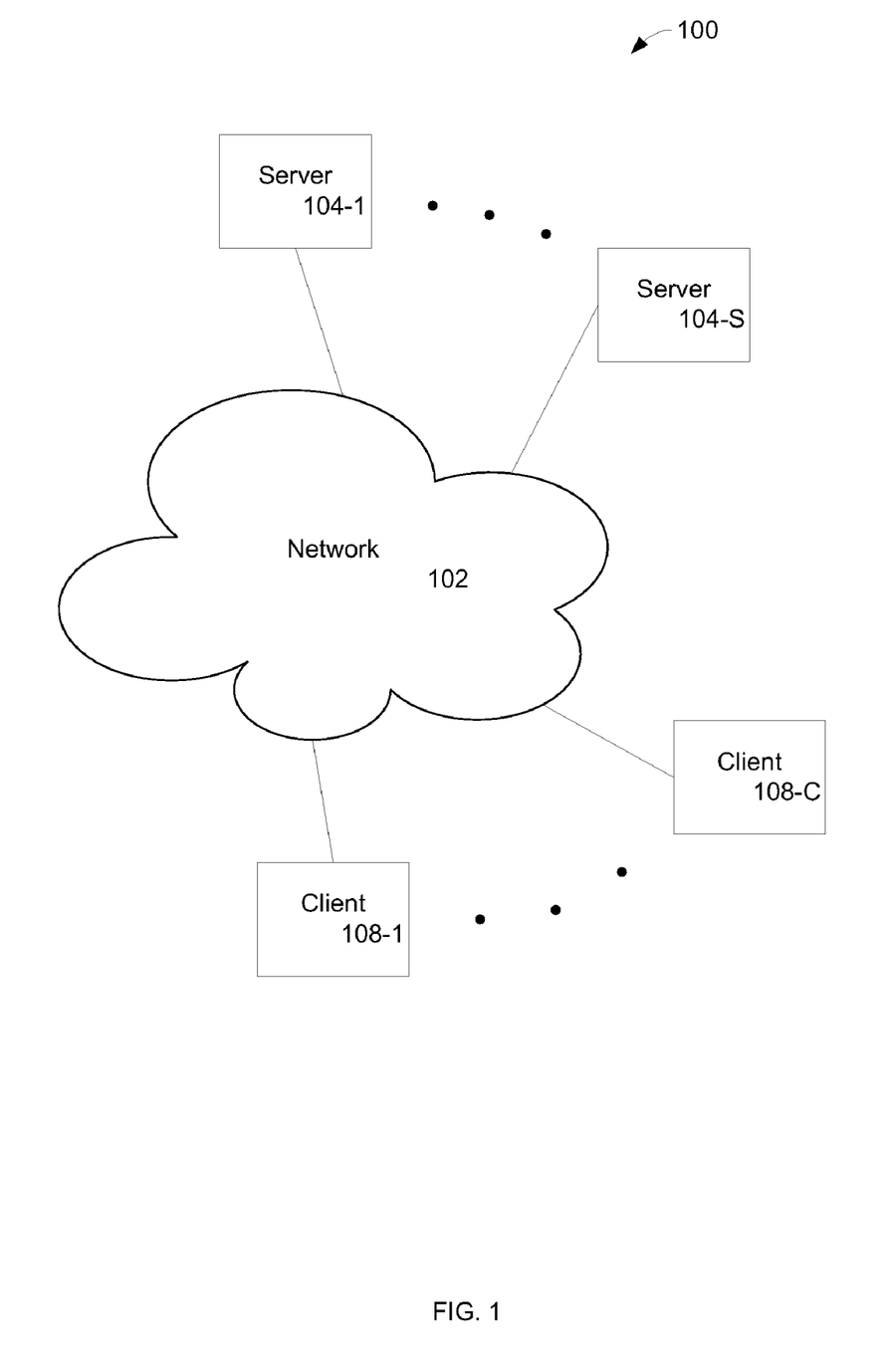
FIG. 1 illustrates a network environment in which embodiment(s) of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
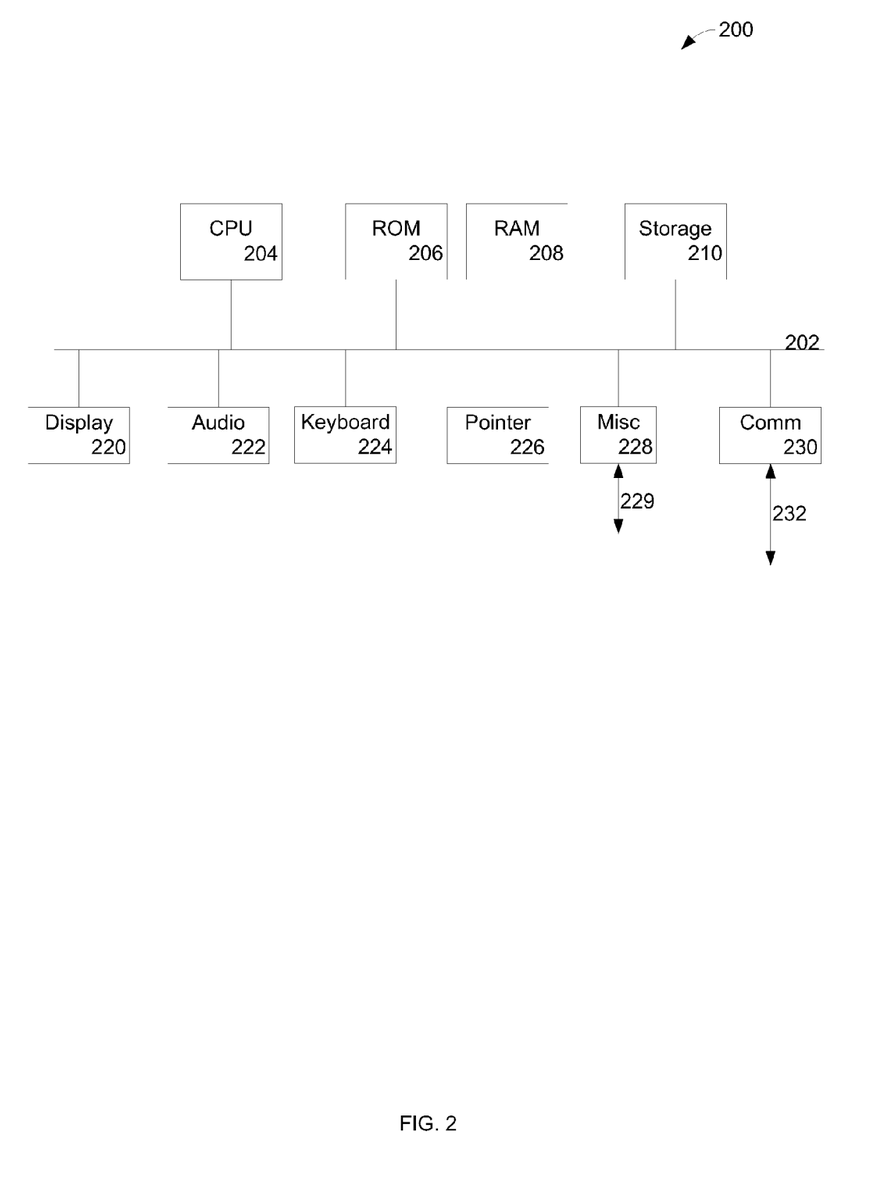
FIG. 2 is a block diagram of a computer system in which embodiment(s) of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, CPU, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. CPU 204 might use, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which when received cause physical movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Reference has been made to "SPI", "SPI-4", and similar terms. One of skill in the art will understand that this refers to the System Packet Interface and the specification as published by the Optical Internetworking Forum (OIF). Such specifications may be obtained from the OIF at http://www.oiforum.com/. One of skill in the art is considered familiar with the SPI specification.

Thus a method and apparatus for queue concatenation have been described.

What is claimed is:

1. A method comprising:
   routing on a per-channel basis both flow control and data in a first queue;
   presenting said data at an egress of said first queue;
   receiving said data at an ingress of a second queue; and
   scheduling said data based on a second queue status signal.

2. The method of claim 1 wherein said data is selected from the group consisting of a packet, and packet fragments.

3. The method of claim 2 wherein said scheduling further comprises receiving a status signal from an external interface.

4. A machine-readable medium having stored thereon instructions, which when executed performs the method of claim 1.

5. An apparatus comprising:
   a first queue having an ingress and an egress, said ingress capable of receiving flow control and packet data; and
   a second queue having an ingress and an egress, said ingress operatively coupled to said first queue egress, and said second queue egress capable of transmitting said flow control and said packet data.

6. The apparatus of claim 5 further comprising a port having an input and an output, said input capable of receiving flow control information and said output coupled to said second queue.

7. An apparatus comprising:
   means for routing on a per-channel basis both flow control and data in a first queue;
   means for presenting said data at an egress of said first queue;
   means for receiving said data at an ingress of a second queue; and
   means for scheduling said data based on a second queue status signal.

8. The apparatus of claim 7 wherein said data is selected from the group consisting of a packet, and packet fragments.

9. The apparatus of claim 8 wherein said means for scheduling further comprises means for receiving a status signal from an external interface.

10. An apparatus comprising:
    a plurality of on-chip queues, each having an ingress, and an egress;
    one or more flow control and data paths associated with each of said plurality of on-chip queues, wherein information from said one or more flow control and data paths flows through each said associated with each of said plurality of on-chip queues; and one or more logic blocks which may selectively couple one or more of said plurality of on-chip queues said egress to one or more of said plurality of on-chip queues said ingress.

11. The apparatus of claim 10 further comprising an external signal input, said input coupled to said one or more logic blocks.

* * * * *